United States Patent
Draper et al.

(10) Patent No.: US 12,467,203 B2
(45) Date of Patent: Nov. 11, 2025

(54) DOCTOR BLADE INCLUDING NATURAL REINFORCEMENT FABRIC LAYERS BONDED TOGETHER WITH BIO-DERIVED RESIN MATRIX

(71) Applicant: Kadant Inc., Westford, MA (US)

(72) Inventors: Michael Draper, Wigan (GB); Ka Lun To, Bury (GB)

(73) Assignee: Kadant Inc., Westford, MA (US)

( * ) Notice: Subject to any disclaimer, the term of this patent is extended or adjusted under 35 U.S.C. 154(b) by 282 days.

(21) Appl. No.: 17/986,175

(22) Filed: Nov. 14, 2022

(65) Prior Publication Data

US 2023/0151546 A1    May 18, 2023

Related U.S. Application Data

(60) Provisional application No. 63/279,379, filed on Nov. 15, 2021.

(51) Int. Cl.
    D21G 3/00    (2006.01)
    B32B 5/02    (2006.01)
    (Continued)

(52) U.S. Cl.
    CPC ............. *D21G 3/005* (2013.01); *B32B 5/022* (2013.01); *B32B 7/12* (2013.01); *B32B 23/10* (2013.01);
    (Continued)

(58) Field of Classification Search
    CPC .......... D21G 3/005; B32B 5/022; B32B 7/12; B32B 23/10; B32B 37/1284;
    (Continued)

(56) References Cited

U.S. PATENT DOCUMENTS 3,688,336 A * 9/1972 Edward, Jr. ........... B41F 9/1045
                                                    15/256.51
4,549,933 A   10/1985 Judd et al.
(Continued)

FOREIGN PATENT DOCUMENTS

CN   115505248 A * 12/2022 ............. C08J 5/043
CN   118339340 A *  7/2024 ............. B32B 23/10
(Continued)

OTHER PUBLICATIONS

Communication pursuant to Rules 161(1) and 162 EPC issued by the European Patent Office in related European Patent Application No. 22830005.9 on Jun. 25, 2024, 3 pages.
(Continued)

*Primary Examiner* — Jose A Fortuna
(74) *Attorney, Agent, or Firm* — Gesmer Updegrove LLP

(57) ABSTRACT

A doctor blade for contacting a roll surface in a papermaking machine is provided that includes a plurality of reinforcement fabric layers bonded together with a renewable, sustainable, eco-friendly, bio-derived resin matrix, thereby forming a multi-layer composite having a beveled edge contacting a roll surface. Each reinforcement fabric layer comprises renewable, sustainable, eco-friendly, natural reinforcement fibres, and the bio-derived resin matrix is a polymeric resin matrix produced from renewable natural resources.

6 Claims, 2 Drawing Sheets

(51) Int. Cl.
*B32B 7/12* (2006.01)
*B32B 23/10* (2006.01)
*B32B 37/12* (2006.01)

(52) U.S. Cl.
CPC ...... *B32B 37/1284* (2013.01); *B32B 2250/04* (2013.01); *B32B 2250/05* (2013.01); *B32B 2250/42* (2013.01); *B32B 2262/062* (2013.01); *B32B 2305/28* (2013.01); *B32B 2307/7163* (2013.01); *B32B 2307/732* (2013.01)

(58) Field of Classification Search
CPC ............ B32B 2250/04; B32B 2250/05; B32B 2250/42; B32B 2262/062; B32B 2305/28; B32B 2307/7163; B32B 2307/732
See application file for complete search history.

(56) References Cited

U.S. PATENT DOCUMENTS

| | | | | |
|---|---|---|---|---|
| 6,207,021 | B1 * | 3/2001 | Eriksson | B31F 1/145 34/120 |
| 10,569,491 | B2 * | 2/2020 | Eriksson | D21G 3/005 |
| 11,072,142 | B2 * | 7/2021 | Eriksson | B31F 1/14 |
| 11,459,701 | B2 * | 10/2022 | Draper | B32B 5/26 |
| 11,814,793 | B2 * | 11/2023 | Viitasalo | D21F 1/483 |
| 12,209,372 | B2 * | 1/2025 | Winter | B29C 70/228 |
| 2013/0139988 | A1 * | 6/2013 | Draper | B82Y 30/00 977/773 |
| 2014/0023846 | A1 * | 1/2014 | Draper | D21G 3/005 428/220 |
| 2019/0301098 | A1 * | 10/2019 | Draper | B32B 5/26 |
| 2020/0147919 | A1 * | 5/2020 | Eriksson | D21G 3/005 |
| 2021/0095434 | A1 * | 4/2021 | Winter | E01H 5/061 |
| 2022/0403596 | A1 * | 12/2022 | Viitasalo | D21F 3/105 |
| 2023/0151546 | A1 * | 5/2023 | Draper | D21G 3/005 162/281 |

FOREIGN PATENT DOCUMENTS

| | | | | |
|---|---|---|---|---|
| EP | 3209495 | A1 | 8/2017 | |
| EP | 3209495 | B1 * | 5/2020 | ............. B32B 19/06 |
| EP | 4108828 | A1 | 12/2022 | |
| EP | 4108828 | B1 * | 2/2024 | ............. C08J 5/043 |
| GB | 2529571 | A * | 2/2016 | ............. B32B 19/06 |
| WO | WO-2009100641 | A1 * | 8/2009 | ............. D21H 19/50 |
| WO | WO-2021074492 | A1 * | 4/2021 | ............... D21F 3/08 |
| WO | WO-2023086617 | A1 * | 5/2023 | ............. B32B 23/10 |

OTHER PUBLICATIONS

Notification Concerning Transmittal of International Preliminary Report on Patentability and the International Preliminary Report on Patentability issued by the International Bureau of WIPO in related international application No. PCT/US2022/049789 on May 30, 2024, 8 pages.

Notification of Transmittal of the International Search Report and the Written Opinion of the International Searching Authority (the European Patent Office) and the International Search Report and the Written Opinion issued in related International Application No. PCT/US2022/049789 issued on Mar. 22, 2023, 11 pages.

* cited by examiner

DOCTOR BLADE INCLUDING NATURAL REINFORCEMENT FABRIC LAYERS BONDED TOGETHER WITH BIO-DERIVED RESIN MATRIX

PRIORITY

The present application claims priority to U.S. Provisional Patent Application No. 63/279,379 filed Nov. 15, 2021, the disclosure of which is hereby incorporated by reference in its entirety.

BACKGROUND

The present invention relates generally to composite doctor blades used in papermaking, web converting and other industrial process industries.

Composite doctor blades contact the surface of rolls in papermaking, web converting and process industry machines for the purpose of cleaning or sheet removal. Conventional composite doctor blade materials usually include reinforcement fabrics comprising glass, carbon, cotton, or aramid fibers in a thermoset or thermoplastic resin matrix. For example, composite doctor blades are traditionally comprised of fabric substrates held together by polymeric resins, with the combination of substrate and resin providing the desired properties for efficient doctoring. Thermoset resins, e.g., epoxy resins, tend to be harder wearing, whilst high performance thermoplastic resins, such as polyphenylene sulphide (PPS) tend to be able to withstand higher machine temperatures and are less susceptible to chemical attack. A bevel edge is machined into the polymer composite to produce an angled slant at the tip of the blade to aid roll cleaning or sheet removal. The sharper and cleaner this edge is, the more efficient the initial performance of the doctor blade.

Doctor blades made from different materials are known. See, for example, U.S. Pat. No. 4,549,933, which describes doctor blades for a paper machine consisting of a number of layers of synthetic fibrous material and carbon fiber with the synthetic fibrous layers consisting of cotton, paper, fiberglass, or equivalents thereof.

In traditional fiber-reinforced composite doctor blades, the fibers are comprised of cotton, glass, or carbon fibers. These fibers are grouped into fiber bundles and then woven with half the fibers in the direction parallel to the paper machine (cross machine direction) and half in the direction perpendicular to the paper machine (machine direction). The majority of woven fabrics have the same material in both directions. These fabrics are then impregnated with resin, and a number of pre-pregged fabrics are stacked up and subsequently compression molded to form the doctor blade. The different types of fibers provide different advantages and disadvantages for doctor blades. Carbon fibers, while expensive, provide excellent wear resistance and high strength if the fibers are placed in one direction. Glass fibers can provide very good cleaning of roll surfaces. Cotton fibers will provide acceptable performance in some applications at economical cost in combination with other materials. U.S. Patent Application Publication No. 2019/0301098 discloses a wear composite doctor blade that includes at least two layers of a structural material and at least one layer of a non-solid metal material.

There remains a need however, for wear components in a papermaking system such as doctor blades, to provide improved wear resistance yet efficient processing of the roll surface.

SUMMARY

In accordance with an aspect, the invention provides a wear element is disclosed for contacting a roll surface in a papermaking machine. The wear element includes a renewable, sustainable, eco-friendly, bio-derived resin matrix and renewable, sustainable, eco-friendly, natural reinforcement fibres In accordance with another aspect, the invention provides a biodegradable bio-composite doctor blade, produced from renewable, natural materials that is a sustainable, eco-friendly product with a reduced environmental impact, creates less environmental pollution and has a reduced carbon footprint.

In accordance with a further aspect, the invention provides a method of forming a doctor blade comprising bonding a plurality of layers of a flax fibre reinforced fabrics with a polyfurfuryl alcohol resin.

BRIEF DESCRIPTION OF THE DRAWINGS

The following description may be further understood with reference to the accompanying drawings in which.

DETAILED DESCRIPTION

The present invention provides a composite doctor blade constructed from a renewable, sustainable, eco-friendly, bio-derived resin matrix and renewable, sustainable, eco-friendly, natural reinforcement fibres. These new novel composite doctor blades are environmentally friendly and include no toxic or harmful components in their construction. They also help to conserve natural resources and assist with maintaining an ecological balance. Composite doctor blades are consumable wear components that contact the surface of rolls in papermaking, web converting and process industry machines for the purposes of cleaning the roll surface, removing water, liquid or contaminants and/or to aid sheet removal. Composite doctor blade materials are traditionally constructed from a thermoset or thermoplastic polymer resin matrix originating from fossil-fuel, oil or petroleum based raw materials and synthetic manmade reinforcement fabrics typically comprising of glass, carbon, or aramid fibres or combinations thereof. Both thermoset and thermoplastic resins traditionally originate from non-renewable resources that require thousands or even millions of years to replenish. This invention involves the use of renewable, sustainable polymers or biopolymers obtained from renewable natural resources that can be easily replaced or have an endless supply and can, therefore, be replenished within a few years. Renewable raw materials are, therefore, classed as sustainable raw materials.

Figure 1:
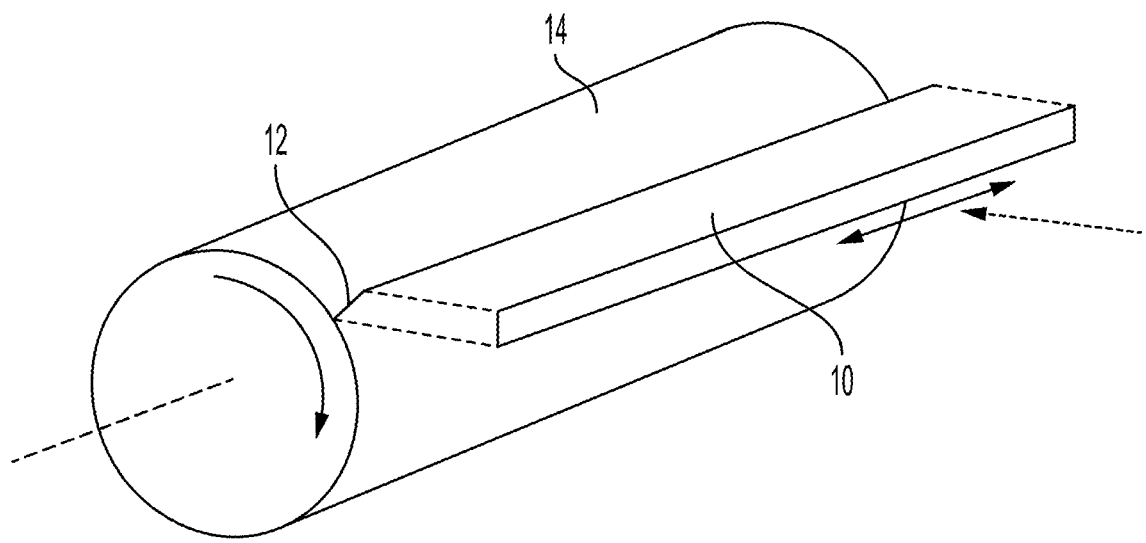
FIG. 1 shows an illustrative diagrammatic view of a wear element in accordance with an aspect of the invention used as a doctor blade.
Figure 2:
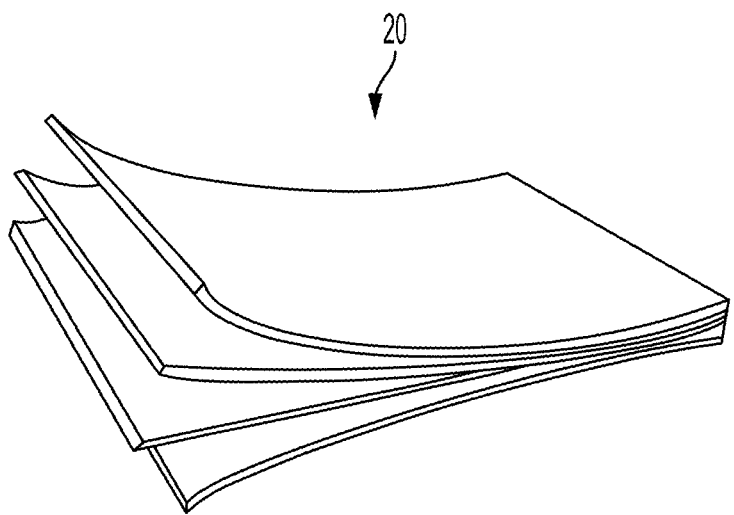
FIG. 2 shows an illustrative diagrammatic view of a laminate being formed in accordance with an aspect of the present invention.

Such renewable natural sources include, e.g., starch sugars, lipids, corn, sugar beet, wheat, other starch rich products, and feedstocks. Processing methodologies such as enzymatic processes, bacterial fermentation and combination with other feedstocks convert biological materials into a final feedstock or the final renewable polymers. Traditional resins typically require solvents for processing, that in turn need to be dried off, so this move away from petroleum-based raw materials not only produces organic composite doctor blades with increased sustainability but reduces their environmental impact and eliminates the need for solvent processing, which in turn reduces both the energy consumption and green-house gas emission involved in their manufacture. FIG. 1, for example, shows a doctor blade 10 formed of organic materials with a beveled contact edge 12 contacting a roll surface 14. FIG. 2 shows at 20 the multilayer organic doctor blade formed via a lamination process.

The synthetic reinforcement fibres traditional typically used in composite doctor blade constructions use mineral resources and energy in their manufacture with the majority of carbon fibres in particular derived from fossil fuel, whilst glass fibre is manufactured using fossil fuel fired furnaces. Traditional thermoset resins, e.g., epoxy resins, tend to be harder wearing, whilst typical high performance thermoplastic resins, such as polyphenylene sulphide (PPS) tend to be able to withstand higher machine temperatures and are less susceptible to chemical attack. Traditional composite doctor blades are by definition extremely durable materials that are designed to resist abrasive wear and that are made to last. This makes them extremely difficult to dispose of, the only option often being deposited in landfills. This is not sustainable and is undesirable from an environmental standpoint. Landfill space is diminishing, costs are escalating and there is therefore a requirement for composite doctor blades to be made from greener materials that are biodegradable and/or have the potential to be composted.

Biodegradable polymers can be broken down into organic substances by living organisms, e.g. micro-organisms. Recyclability can, therefore, be improved using greener technologies based on reversible bio-based bonding materials. Renewable polymers are not necessarily biodegradable, but biodegradable polymeric resins, produced from renewable resources, do have further additional benefits. Composite doctor blades made with biodegradable resins produced from renewable sources, can provide waste feedstocks for future processing, or for energy recovery or can break down and return nutrients to the soil rather than requiring landfill as an end of life solution. The biodegradable bio-composite doctor blades of this invention, produced from renewable natural materials are, therefore, sustainable eco-friendly products, that have reduced environmental impact, create less environmental pollution and have a reduced carbon footprint. This transition away from virgin petrochemicals and the resulting carbon and fossil fuel reduction in their manufacture and the associated potential to be able to turn waste back into raw materials will enable a circular economy to be created for composite doctor blades.

Traditionally the petroleum and oil based polymeric resins of composite doctor blades are used to hold a number of layers of fabric substrate together, with the combination of fibrous substrate and the resin providing the desired properties for efficient doctoring. Doctor blades made from many different materials are known. See U.S. Pat. No. 4,549,933, which describes a doctor blade for a paper machine consisting of a number of alternating layers of fibre, typically synthetic fibre such as glass fibre, carbon fibre and aramid fibre or equivalents thereof. Once again there is a need for a natural, environmentally friendly renewable and sustainable alternative to these synthetic reinforcement fibres. Flax is once such fibrous material.

This invention describes a novel composite doctor blade composed from a renewable sustainable eco-friendly bio-resin matrix and renewable, sustainable, eco-friendly, natural reinforcement fibres. In accordance with an aspect, a doctor blade may be provided from sustainable plant fibres that are held together with resin (e.g., organic resin) produced from plant waste. Plants sequester carbon dioxide from the earth's atmosphere in order to grow and are, therefore, both eco-friendly and green, net negative carbon materials. Examples of natural plant reinforcement fibres include cotton, flax, jute, bluebell tunicate, wood, hemp, kenaf, Nettle.

One example of systems in accordance with an aspect of the invention includes the incorporation of organic fibres (e.g., flax fibres) in a PFA bioresin system produced from crop waste, whereby the flax fibres have been extracted from the flax plant stem. Flax fibres are typically lighter than carbon fibre, of similar stiffness to glass fibre and have good wear and abrasion properties. They require much lower energy in their production, they are carbon dioxide neutral, recyclable and biodegradable, whilst at the same time being safe to handle, non-toxic, non-irritating and with a much higher sustainability rating.

Whilst the PFA (Polyfurfuryl alcohol) resin is 100% bio-derived from crop waste, e.g., sugar cane bagasse, which is renewable, sustainable and plentiful. The starting material is furfural, which is extracted from the waste material produced during sugarcane processing (known as bagasse). This is first converted to fufuryl alcohol, which is then polymerised to form the polyfurfuryl alcohol resin. This resin is water-soluble, but then cures via an acid-catalysed polycondensation reaction. Thus, it is a by-product of food production and, therefore, does not compete for land, whilst its high temperature resistance with in-service temperature of 200° C. and high chemical resistance make it suitable for a composite doctor blade component. Its low toxicity and low VOC make it a sustainable eco-friendly alternative with significantly less environmental impact with regard to marine aquatic ecotoxicity, fresh water aquatic ecotoxicity, human toxicity and global warming when compared to the traditional thermoset epoxy, polyester and phenolic resins made from petrochemical and fossil fuel sources that are traditionally used in the manufacture of composite doctor blades.

Other ecological alternatives to carbon, glass & other manmade fibres are hemp, jute, cellulose and regenerated cellulose fibres, recycled wood and bamboo, whilst other renewable bio-based monomers of biological origin include plant oil, vegetable based sources, crop processing bi-products and algae. These can replace fossil fuel, crude oil, natural gas and petrochemical hydrocarbon based resins. Another example includes using cashew nut shell liquid as a resin. Further, peanut hulls heated at 500° C. in a furnace produce biocarbon. Furnace heating this biocarbon in an inert atmosphere will produce syngas, other condensable, non-condensable gases and bio-oil that can be collected and in turn be used as a monomer to generate a renewable bio-based polymeric matrix.

In traditional fibre-reinforced composite doctor blades, the fibers are comprised of glass, carbon or aramid fibres. These fibres are grouped into fibre bundles and then woven with half the fibres in the direction parallel to the paper machine and half in the direction perpendicular to the paper machine. The vast majority of woven fabrics have the same material in both directions. These fabrics are then impregnated with resin, and a number of pre-pregged fabrics are stacked up and subsequently compression molded to form the doctor blade. The different types of fibers provide different advantages and disadvantages for doctor blades. Carbon fibers, while expensive, provide excellent wear resistance and high strength if the fibers are placed in one direction. Glass fibers can provide very good cleaning of roll surfaces. Aramid fibres will provide impact resistance and strength.

The reinforcement fabrics used are typically glass, carbon or combinations of both. Glass fabrics impart the doctor blades with cleaning and abrasive properties, whilst carbon reinforcement is used to improve the wear life of the doctor blade. Different combinations of both are used depending on the property and performance requirement of a particular doctor blade In accordance with various aspects, the invention provides a doctor blade made by combining several individual layers of reinforcement fabric comprised of renewable, sustainable, eco-friendly, natural reinforcement fibres together with a renewable sustainable eco-friendly bio-derived polymeric resin matrix. These new novel composite doctor blades are environmentally friendly and include no toxic or harmful components in their construction. They also help to conserve natural resources and assist with maintaining an ecological balance. Heat and pressure are used to cure the polymeric resin and chemically bond the individual reinforcement layers together.

Figure 3:
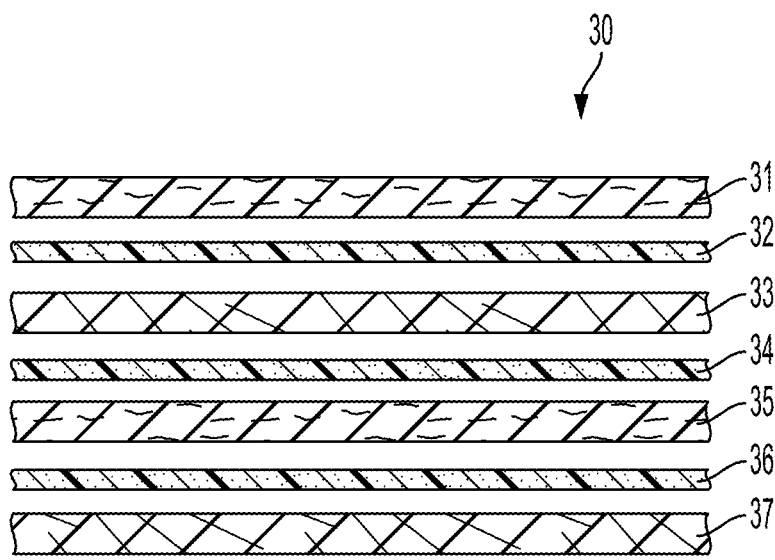
FIG. 3 shows an illustrative diagrammatic view of a four layer wear element in accordance with a further aspect of the present invention.

FIG. 3 shows at 30 a wear element that includes organic material in accordance with an aspect of the present invention where layers 31, 33, 35, 37 are formed of fabrics from any of flax fibre, cotton, jute, bluebell tunicate, wood, recycled wood, bamboo, hemp, kenaf, nettle, cellulose and regenerated cellulose fibers as discussed herein. Further, starch sources may include any of starch sugass, lipids, corn sugarbeet and wheat, and processing technologies may include any of enzymatic processes, bacterial fermentation, and combinations with other feedstocks. The resin (32, 34, 36) may be formed of any of polyferferyl alcohol, cashew nut shell liquid, syngas from heated biocarbon from processing of any of plant oil, vegetable-based sources, crop processing bi-products and alghea. For example, 4 layers of 300 gsm Flax fibre reinforcement fabric (31, 33, 35, 37) may be bonded together with a bio derived PFA resin matrix (32, 34, 36) to produce a doctor blade of thickness 1.4 mm.

Figure 4:
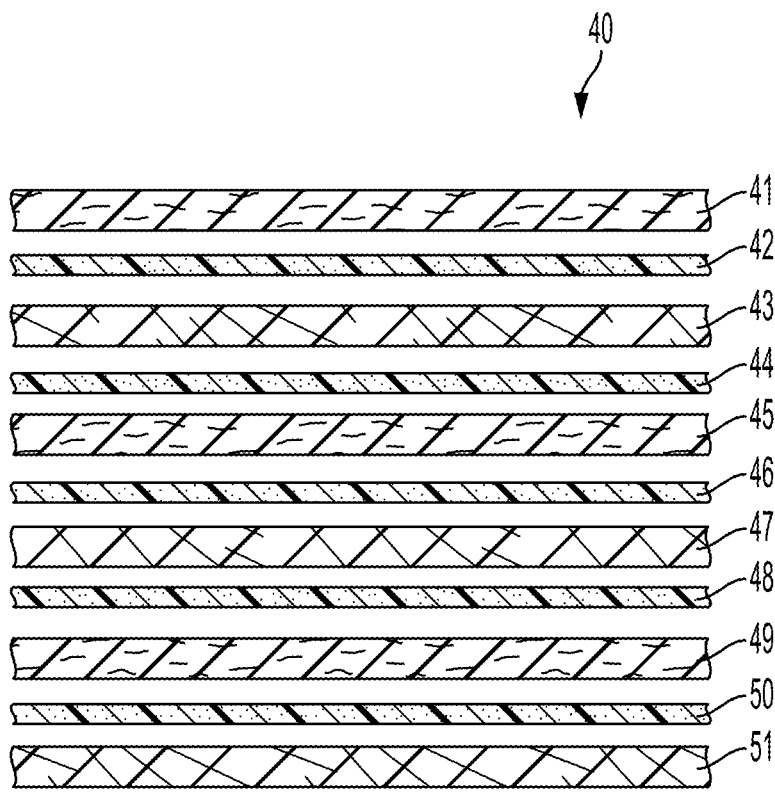
FIG. 4 shows an illustrative diagrammatic view of a six layer wear element in accordance with a further aspect of the present invention The drawings are shown for illustrative purposes only.

FIG. 4 shows at 40 a wear element that includes organic material in accordance with an aspect of the present invention where layers 41, 43, 45, 47, 49, 51 are formed of fabrics from any of flax fibre, cotton, jute, bluebell tunicate, wood, recycled wood, bamboo, hemp, kenaf, nettle, cellulose and regenerated cellulose fibers as discussed herein. Further, starch sources may include any of starch sugass, lipids, corn sugarbeet and wheat, and processing technologies may include any of enzymatic processes, bacterial fermentation, and combinations with other feedstocks. The resin (42, 44, 46, 48, 50) may be formed of any of polyferferyl alcohol, cashew nut shell liquid, syngas from heated biocarbon from processing of any of plant oil, vegetable-based sources, crop processing bi-products and alghea. For example, 6 layers of 300 gsm Flax fibre reinforcement fabric (41, 43, 45, 47, 49, 51) may be bonded together with a bio derived PFA resin matrix (42, 44, 46, 48, 50) to produce a doctor blade of 2.0 mm thickness.

A bevel edge is machined into the polymer composite to produce an angled slant at the tip of the blade to aid roll cleaning or sheet removal. The sharper and cleaner this edge is, the more efficient the performance of the doctor blade.

Those skilled in the art will appreciate that numerous modifications and variations may be made to the above disclosed embodiments without departing from the spirit and scope of the present invention.

What is claimed is:

1. A doctor blade for contacting a roll surface in a papermaking machine, said doctor blade comprising:
   a plurality of reinforcement fabric layers bonded together with a renewable, sustainable, eco-friendly, bio-derived resin matrix, thereby forming a multi-layer composite having a beveled edge contacting a roll surface,
   wherein each reinforcement fabric layer comprises renewable, sustainable, eco-friendly, natural reinforcement fibres, the natural reinforcement fibres being selected from the group consisting of flax, jute, bluebell tunicate, wood, recycled wood, hemp, cellulose, regenerated cellulose fibres, bamboo, kenaf and nettle, and
   wherein the bio-derived resin matrix includes a polymeric resin matrix produced from renewable natural resources, the renewable natural resources being selected from the group consisting of starch sugars, lipids, corn, sugar beet, wheat, sugar cane bagasse, plant oil, vegetable based sources, crop processing bi-products, algae, peanut hulls, and cashew nut shell oil.

2. The doctor blade as claimed in claim 1, wherein the polymeric resin matrix is a polyfurfuryl alcohol bio-resin derived from sugar cane bagasse.

3. The doctor blade as claimed in claim 1, wherein the natural reinforcement fibres are flax fibres.

4. The doctor blade as claimed in claim 1, wherein the polymeric resin matrix is biodegradable.

5. The doctor blade as claimed in claim 1, wherein the polymeric resin matrix is a polyfurfuryl alcohol bio-resin, and the natural reinforcement fibres are flax fibres.

6. The doctor blade as claimed in claim 1, wherein the doctor blade is compostable.

* * * * *